United States Patent [19]

Kushibiki et al.

[11] Patent Number: 4,892,396
[45] Date of Patent: Jan. 9, 1990

[54] VARIABLE-FOCUS OPTICAL DEVICE

[75] Inventors: Nobuo Kushibiki, Ebina; Yoko Yoshinaga, Machida, both of Japan

[73] Assignee: Canon Kabushiki Kaisha, Tokyo, Japan

[21] Appl. No.: 53,676

[22] Filed: May 26, 1987

[30] Foreign Application Priority Data

May 26, 1986 [JP] Japan ................ 61-119182

[51] Int. Cl.⁴ .................. G02B 15/00; G02B 3/14
[52] U.S. Cl. ..................... 350/423; 350/419
[58] Field of Search ........... 350/418, 419, 423, 409

[56] References Cited

FOREIGN PATENT DOCUMENTS 60-254013 12/1985 Japan .................. 350/419
60-254014 12/1985 Japan .................. 350/419

Primary Examiner—Scott J. Sugarman
Attorney, Agent, or Firm—Fitzpatrick, Cella, Harper & Scinto

[57] ABSTRACT

An variable-focus optical device capable of changing the focal length with excellent responsiveness and reproducibility during repetitive deformation, comprises: an elastomeric member having prescribed viscoelastic characteristics, and an aperture member having an aperture adapted for causing projection or sinking of the elastomeric member therethrough or thereat.

7 Claims, 3 Drawing Sheets

VARIABLE-FOCUS OPTICAL DEVICE

FIELD OF THE INVENTION AND RELATED ART

The present invention relates to a variable-focus optical device capable of changing the focal length through deformation of an optical surface particularly to a variable-focus optical device capable of changing the focal length wit excellent reproducibility while retaining a desired shape of the optical surface.

Heretofore, as variable-focus or variable- focal-length lenses, a so-called "liquid lens" which is changed in shape by liquid pressure, as disclosed in Japanese Laid-Open Patent Application No. 36875/1980, and a lens with the use of a piezoelectric member, as disclosed in Japanese Laid-Open Patent Application Nos. 110403/1981 and 85415/1983, have been proposed. However, the so-called liquid lens of the former one additionally requires a liquid reservoir and a pressurizing means, which pose difficulties in making a compact device and in that it causes a large surface deformation due to gravity and vibration, while the latter has a drawback that the variable range is small.

In order to obviate the above difficulties, there have been proposed variable-focus optical devices capable of changing the focal length through deformation of a light-transmissive (or transparent) elastomeric or elastic member by our research group, as disclosed in Japanese Laid-Open Patent Application Nos. 84502/1985 and 111201/1985. In these variable-focus optical devices, more specifically, the light-transmissive elastomeric member is caused to project or sink through an aperture or opening to arbitrarily deform an optical surface formed by the elastomeric member at the aperture, thereby to obtain a desired focal length.

Further, in connection with the above Japanese Laid-Open Patent Application Nos. 84502/1985 and 111201/1985, our research group has proposed several optical devices as follows: one wherein an optical surface formed by an elastomeric member is used as a reflective surface (Japanese Laid-Open Patent Application No. 114802/1985); one wherein the elasticity modulus of an elastomeric member forming an optical surface is increased thereby to improve the stickiness of the optical surface (Japanese Laid-Open Patent Application No. 114804/1985); one wherein, aperture members are oppositely provided on the upper and lower sides of an elastomeric member (Japanese Laid-Open Patent Application No. 114805/1985); one wherein an optical surface is caused to have a distribution or gradient of elasticity modulus thereby to form a desired optical surface (Japanese Laid-Open Patent Application No. 120301/1985); one wherein a surface part of an elastomeric member, except an optical surface, is cured or hardened with the purpose of making the optical device compact (Japanese Laid-Open Patent Application No. 120303/1985); one wherein the position of an optical axis, as well as the focal length, is changed by changing the direction of an aperture (Japanese Laid-Open Patent Application No. 151603/1985); one wherein a bottom plate opposing an aperture member is made convex or concave thereby to obtain a desired optical surface (Japanese Laid-Open Patent Application No. 156003/1985); etc.

However, a variable-focus optical device comprising a known elastomeric member involves a problem that a larger deformation is liable to occur in the neighborhood of the periphery of an aperture than in the neighborhood of the aperture center, e.g., because of stress concentration near the aperture periphery. As a result, a nonspherical surface having a larger curvature near the aperture periphery is formed during deformation, or the shape of an optical surface is liable to change from a sphere into a nonshere, although it is desired to change while retaining a spherical shape, so that it is still insufficient to provide desired optical characteristics.

SUMMARY OF THE INVENTION

In view of the problems as described above, a principal object of the present invention is to provide a variable focus optical device capable of constantly retaining, e.g., a spherical surface or a desired aspherical surface during deformation, and excellent in responsiveness and reproducibility during repetitive deformation.

According to the present invention, there is provided a variable-focus optical device comprising: an elastomeric member and an aperture member having an aperture adapted for causing projection or sinking of the elastomeric member therethrough or thereat to deform the surface of the elastomeric member; wherein the elastomeric member comprises an elastomeric material having a storage elastic modulus and a loss elastic modulus respectively in a range of $5 \times 10^2$ to $1 \times 10^8$ dyne/cm$^2$, and a dynamic loss factor of not larger than 1, respectively, in a frequency range of 0.1 rad/sec to $1 \times 10^3$ rad/sec.

In the variable-focus optical device of the present invention, since an elastomeric or elastic material having elasticity characteristics in the above range is used, a state of deformation of an optical surface formed by the elastomeric member, corresponding to a desired function of the optical device, can easily be obtained, a desired shape of the optical surface can be retained during deformation, and the shape of the optical surface can be changed with excellent responsiveness and reproducibility.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
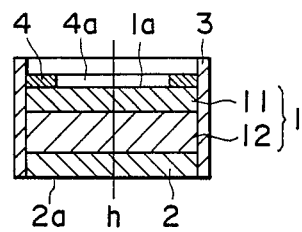
FIG. 1 is a schematic sectional view showing an embodiment of the variable-focus optical device according to the present invention.

A variable-focus optical device shown in FIG. 1 comprises: an elastomeric or elastic member 1 comprising a first elastomeric layer 11 and a second elastomeric layer 12 disposed thereon in a laminated form along an optical axis h; an aperture member 4 of a circular plate having a circular aperture or opening 4a at the center; a bottom plate 2; and a side plate 3.

In the above variable-focus optical device, the first and second elastomeric layers respectively comprise elastomeric materials having mutually different elasticity moduli and area heat-transmissive or transparent to light passing therethrough.

In the variable-focus optical device, optical surfaces comprise a surface part of the elastomeric member 1 located below or exposed through the aperture 4a, and an outer surface 2a of the bottom plate 2.

Incidentally, the bottom plate 2 and the side plate 3 may be provided as desired, and therefore these members are not necessarily provided.

The aperture member 4 and the side plate 3 may comprise a relatively rigid material such as metal, glass, or resin, and the aperture member 4 may be formed into, e.g., a circular plate having a desired aperture 4a. These members may be either opaque or transparent, respectively.

The bottom plate 2 sandwiching the elastomeric member 1 between itself and the aperture member 4, may comprise a relatively rigid light-transmissive material including glass, resin, etc.

Incidentally, at least one of the bottom plate 2 and the aperture member 4 is disposed movably along the optical axis h.

In this variable-focus optical device, the aperture member 4 and/or the bottom plate 2 may be moved along the optical axis h so as to cause the part of the elastomeric member 1 located below the aperture 4a to project or sink through the aperture 4a (or, at the aperture 4a), thereby to change the curvature of the surface 1a of the elastomeric member and to obtain a desired focal length.

For example, when a part of the elastomeric member 1 including the surface 1a located below the aperture 4a is caused to project (e.g., the curvature of the optical surface 1a is caused to increase), the aperture member 4 may be moved along the optical axis h toward the bottom plate 2 to press the elastomeric member 1. On the other hand, when the part of the elastomeric member 1 located below the aperture 4a is caused to sink (e.g., the curvature of the optical surface 1a is caused to decrease), the aperture member 4 may be moved upward to exert a negative pressure to the elastomeric member 1. In a case where a negative pressure is applied to the elastomeric member 1, it is required to bond the aperture member 4, the first elastomeric layer 11, the second elastomeric layer 12 and the bottom plate 2, respectively to the adjacent member.

The composition or structure of the elastomeric member 1 such as a number of layers constituting the elastomeric member 1, thickness of respective layer, or a gradient or distribution of elasticity modulus in the elastomeric member is appropriately selected depending on the shape of a desired optical surface.

For example, in FIG. 1, the elasticity modulus of the first elastomeric layer 11 ($E_1$) is caused to be larger than that of the second elastomeric layer 12 ($E_2$) to a certain extent, whereby a spherical shape of the optical surface 1a can be retained during deformation of the elastomeric member 1. Further, in the case of $E_1 > E_2$, if $E_1$ is increased so as to make the ratio of $E_1$ to $E_2$ larger than a certain value (for example, $E_1/E_2 = a_1$) corresponding to a spherical shape, or if the thickness of the first elastomeric layer 11 is increased, a nonspherical shape having a smaller curvature near the periphery of the aperture 4a can be retained during the deformation.

On the other hand, if $E_1$ is decreased so as to make the ratio of $E_1$ to $E_2$ smaller than the above $a_1$ or if the thickness of the first elastomeric layer 11 is decreased, a nonspherical shape having a larger curvature near the periphery of the aperture 4a can be retained during the deformation.

It may be considered that such effect of the present invention can be achieved on the following principle.

Thus, e.g., in the case of $E_1 > E_2$, when the aperture member 4 is moved toward the bottom plate 2, a larger degree of deformation is liable to occur in the second elastomeric layer 12.

Such deformation is liable to make the boundary between the first elastomeric layer 11 and the second elastomeric layer 12 a nonspherical shape having a larger curvature near the periphery. In connection with this, a force for curving the first elastomeric layer 11, which is caused by a rise of a center portion of the second elastomeric layer 12, and a force for increasing the area of the boundary between the first elastomeric layer 11 and the second elastomeric layer 12 are exerted on the first elastomeric layer 11.

Now, when the first elastomeric layer is thin, a predominant rigidity thereof is tensile rigidity. Therefore, in this case, the first elastomeric layer 11 is liable to minimize its surface area and to change into near paraboloid. On the other hand, when the first elastomeric layer 11 is relatively thick, it is liable to prevent a rapid change in curvature due to its flexural rigidity. Therefore, in both cases, the first elastomeric layer 11 is liable to change into a nonspherical shape having a smaller curvature near the periphery, contrary to the second elastomeric layer 12.

Accordingly, if the effect changing the first elastomeric layer 11 into a nonspherical shape having a larger curvature near the periphery harmonizes with the effect changing the first elastomeric layer 11 into a nonspherical shape having a smaller curvature near the periphery, i.e., if the elasticity moduli are selected so as to satisfy a relation $E_1/E_2 = a_1$, the surface 1a of the first elastomeric layer 11 disposed in the aperture 4a can retain its almost spherical shape during deformation. On the other hand, if the value of $E_1/E_2$ is variously changed into values except $a_1$, the above surface 1a can retain the aforesaid non-spherical shape during deformation.

Incidentally, in a variable-focus optical device using an elastomeric member which has an internally uniform elasticity modulus, a large degree of deformation is liable to occur near the periphery of the aperture 4a and only a smaller deformation is caused near the optical axis h. As a result, the surface of the elastomeric member 1 becomes a non-spherical surface having a larger curvature near the periphery of the aperture 4a, so that it is difficult to change the curvature of the optical surface while retaining its spherical shape, although the optical surface is desired to constantly retain its spherical shape.

In contrast thereto, if the elastomeric member comprises two elastomeric layers having mutually different elasticity moduli, there may be provided a variable-focus optical device capable of constantly retaining a desired shape of an optical surface 1a.

In the present invention, the elastomeric member 1 may preferably comprise plural elastomeric layers in a laminated form as described above. However, the elastomeric member 1 may also comprise a single elastomeric body having a uniform elasticity modulus, in a case where a severe performance is not necessarily required.

In a case where the elastomeric member 1 comprises plural layers, it is preferred that the respective layers comprise elastomeric materials having the above-mentioned storage elastic modulus (G'), loss elastic modulus (G"), and dynamic loss factor (tan δ).

In a case where the elastomeric member 1 comprises two or more layers, the elastomeric member 1 can include a layer of a material not having the above-mentioned G', G" and tan δ, if the weighted average of a viscoelastic constant concerned ($\bar{x}$) of respective layers calculated by the following equation is in the respectively defined range:

$$\bar{x} = \frac{w_1 x_1 + w_2 x_2 + \ldots + w_n x_n}{w_1 + w_2 + \ldots + w_n}$$

wherein $w_n$ represents a thickness of an n-th layer along the optical axis h, $x_n$ ($x_1, x_2 \ldots x_n$) represents the viscoelastic constant concerned, such as G', G" or tan δ of a material constituting the n-th layer, and n is an integer of 2 or more.

In the variable-focus optical device according to the present invention, the elastomeric member 1 comprises an elastomeric or elastic material which has a storage elastic modulus and a loss elastic modulus according to ASTM D-4065, respectively in a range of $5 \times 10^2$ to $1 \times 10^8$ dyne/cm$^2$, preferably in a range of $1 \times 10^3$ to $1 \times 10^7$ dyne/cm$^2$, respectively in a frequency range of 0.1 rad/sec to $1 \times 10^3$ rad/sec, and which has a dynamic loss factor (tan δ) of 1 or below, in a frequency range of 0.1 rad/sec to $1 \times 10^3$ rad/sec.

By using such elastomeric material, there is provided an elastomeric member 1 excellent in responsiveness and reproducibility during deformation.

Generally, in a variable-focus optical device capable of changing the focal length through deformation of an elastomeric member constituting it, there may be required such characteristics of dynamic performance as follows:

(a) surely causing a deformation when an external force is applied thereto;

(b) recovering from a deformation when an external force is removed therefrom; and (c) not or negligibly changing, an amount of deformation and responsiveness in strain even when a frequency of application of an external force varies.

Therefore, it is required to describe the characteristics of an elastomeric member used in the present invention in terms of dynamic viscoelasticity.

As a result of our study on various elastomeric materials having such characteristics of dynamic performance, it has been found that the above requirement may be satisfied by using an elastomeric member which has a storage elastic modulus (G') and a loss elastic modulus (G"), respectively, of not less than $5 \times 10^2$ dyne/cm$^2$ and not more than $1 \times 10^8$ dyne/cm$^2$, and in which a dynamic loss factor (tan δ) satisfies a relation tan δ = G"/G' ≦ 1.

Herein, the above storage elastic modulus and loss elastic modulus respectively correspond to a frequency range of 0.1 rad/sec to $1 \times 10^3$ rad/sec, a typical frequency range corresponding to a stress ordinarily applied to an elastomeric member constituting a variable-focus optical device, when the elasticity modulus of the elastomeric member is expressed in terms of complex elasticity modulus G* represented by the following formula:

$$G^* = G' + iG''$$

wherein G' denotes storage elastic modulus, a term corresponding to ordinary static elasticity modulus relating to an internal energy storaged; and G" denotes loss elastic modulus, a sum of terms depending on viscosity.

Further, G"/G' = tan δ denotes dynamic loss factor (or loss angle) corresponding to a phase delay in strain caused by an application of a stress, and the loss angle shows a degree of dissipation of a part of vibrational energy applied during a period, as a heat loss.

If tan δ exceeds 1, a time delay in deformation of the elastomeric member occurs, and a recovery from the deformation is liable to be delayed, and therefore the responsiveness decreases. In view of molecular theory, a deformation based on fluidity may occur in the interior of an elastomeric member, e.g., comprising a resin.

Further, if G" and G' are out of the above range, aforesaid characteristics of a variable-focus optical device cannot be obtained.

For example, if G' exceeds the above range, the glass-transition temperature of an elastomeric materials is generally elevated and an external force required for deformation thereof is too great, whereby the deformation is almost impossible. On the other hand, if G' is below the above range, an elastomeric member hardly retains its original shape and hardly retains its surface shape due to power deformation.

Further, it is preferable to use an elastomeric material as one constituting the elastomeric member 1, wherein G' and G" have little dependence on the frequency of the above stress, and tan δ has no peak and is 0.1 or less at the maximum frequency in the above range of stress frequency.

Incidentally, in the present invention, G' and G" are measured according to ASTM D-4065. These values can be measured, e.g., by means of a mechanical spectrometer (mfd. by Rheometrics Far East Ltd.).

As a material constituting the elastomeric member 1 of the variable-focus optical device of the present invention, it is possible to use any material as far as it has the aforesaid characteristics as an elastomeric body, and has a sufficient transmissiveness to light passing through the optical device.

Further, the optical surface 1a can be made a reflective surface, e.g., through vapor deposition. In such an embodiment, a material constituting the elastomeric member is not required to be light-transmissive.

Particularly, it is preferable to use an elastomeric member 1 having a spectral transmittance of 80% or larger at 350 nm, and that of 92% or larger in a region of 500 to 700 nm. Further, it is preferable to use an elastomeric member 1 wherein the refractive index is uniform (preferably, a change in refractive index is $10^{-4}$ or below) when it is measured by using interference fringe by means of a Mach-Zehnder interferometer, and/or a degree of double refraction measured by means of a precision strainmeter is λ/4 (λ: wavelength of light) or less in terms of an inserted length of a Babinet compensator. In the precision strainmeter, a phase difference between an ordinary and an extraordinary rays is compensated by means of the Babinet compensator. In a case where the elastomeric member 1 comprises plural layers, it is preferable that the respective layers satisfy the above condition of refractive index or of double-refraction.

As an elastomeric material having the above optical and mechanical characteristics, a polysiloxane may be preferably used.

As a polysiloxane usable in the variable-focus optical device according to the present invention, there can be used one comprising a portion represented by the following structural formula (I):

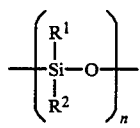

wherein $R^1$ and $R^2$ independently represent methyl, ethyl or phenyl group, respectively, and n is an integer of 25 or more.

Examples of such polysiloxane may be polydimethylsiloxane, poly(dimethyl-diphenyl)siloxane, polymethylphenylsiloxane, poly(dimethyl-diphenylmethylphenyl)-siloxane, and derivatives of these in which a methyl group is partially or entirely replaced by an ethyl group.

Elasticity moduli of these polysiloxanes may be controlled by a degree of polymerization or a degree of crosslinking.

Crosslinking of a polysiloxane may be performed based on a presence of an organic functional group, as a crosslinking site, including vinyl, hydrogenated silyl, amino, carboxyl, alkoxy, epoxy group, etc. These groups may be present in a main chain, at the end of the main chain, and/or in a side chain of a polymer. In crosslinking of a polymer, that based on addition reaction may be preferably used since no byproduct is produced during the crosslinking. It is also possible, however, to use a crosslinking based on condensation since a good crosslinked product can be obtained by desirably setting conditions of crosslinking. Further, crosslinking using electromagnetic wave such as light or radiation, may be possible.

More specifically, there may be preferably used hydrosilylation in which an addition of a hydrogenated silyl group to a vinyl group occurs by using a catalyst comprising a complex compound containing a metal such as platinum palladium, or ruthenium.

In a case where elasticity modulus is controlled by a degree of crosslinking, a large elasticity modulus can be obtained, e.g., by equalizing chain lengths between crosslinking sites in an elastomeric material. Incidentally, strength of an elastomeric material can be increased by increasing the above chain lengths.

In order to obtain desirable elasticity modulus of a polysiloxane, for example, a degree of polymerization thereof may preferably be 25 or more, more preferably 80 or more.

Further, in order to control the rigidity of a polysiloxane, it is applicable to mix a polysiloxane having a degree of polymerization not lower than a certain degree, with another polysiloxane comprising the same structural unit, while appropriately selecting the molecular weight or the mixing amount of the latter.

A polysiloxanes used in the present invention may preferably have a refractive index of 1.35 or higher. This refractive index can be increased by introducing a phenyl or a halogen group thereinto.

However, when a phenyl group is introduced into a polysiloxane at a high concentration, such polysiloxane is liable to crystallize. Even if a phenyl group is introduced at a low concentration, the refractive index is sometimes disturbed due to double refraction or irregularity in the concentration of the introduced phenyl group. It is supposed that such disturbance is caused by an orientation of molecules, e.g., based on Van der Waals force produced between the cyclic structures of a phenyl group, or caused by fluidity of the polymer.

Further, in a case where a phenyl group is introduced by copolymerizing a phenyl-substituted siloxane such as diphenylsiloxane, and an alkyl-substituted siloxane such as dimethylsiloxane, alkyl-substituted siloxane molecules, having a greater reactivity than phenyl-substituted siloxane, molecules, are liable to form a chain of themselves and to form a block or segment. Therefore, if the amount of the phenyl-substituted siloxane is too large, uniformity in refractive index or double refraction may deteriorate.

Accordingly, in a case where a phenyl group is introduced into a polysiloxane, it is required to appropriately set the concentration thereof, or reaction conditions of introduction thereof. For example, it is desirable to set the amount of a phenyl group introduced into a polymer to 30–35 mol % in terms of the ratio of a phenyl group to all the substituents connected to Si atoms. Incidentally, in this case a refractive index of about 1.55 may be obtained.

The elastomeric member in the variable-focus optical device of the present invention may be obtained by using the above elastomeric material such as polysiloxane, and forming it into a prescribed shape, size, etc., corresponding to a desired function of the optical device, through a forming method such as casting or injection.

Hereinbelow, the present invention will be explained in further detail with reference to specific examples of preparation of a variable-focus optical device.

EXAMPLE 1

10 wt. parts of a two-component type polydimethylsiloxane (trade name: KE 106, mfd. by Shinetsu Kagaku Kogyo K.K.) and 1 wt. part of CAT-RG (mfd. by Shinetsu Kagaku Kogyo K.K.) were mixed, stirred, and degassed under a vacuum thereby to prepare a mixture. Then, referring to FIG. 2A, the resultant mixture was poured into a cavity surrounded by an upper mold 13, a lower mold 14 and a side mold 15, and thereafter cured by leaving it for 12 hours at 50° C., thereby to form a first elastomeric layer 61 having a thickness of 1 mm along an optical axis h.

The inside diameter of the side mold 15 was 25 mm, the diameters of curved portions having a curvature of the upper mold 13 and the lower mold 14 were respectively 20 mm, and the curved portions had a curvature radius of 50 mm.

Figures 2A, 2B:
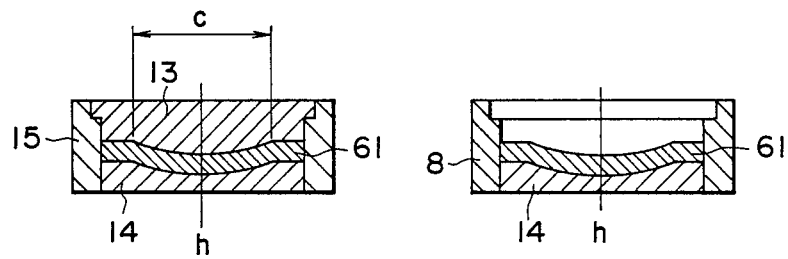
FIGS. 2A to 2D are sectional views for illustrating a process for producing the variable-focus optical device of the present invention.
Figures 2C, 2D:
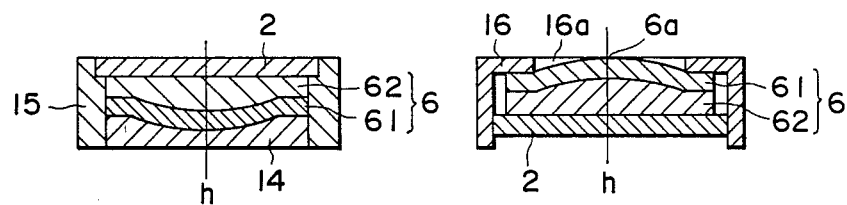

Then, as shown in FIG. 2B, the upper mold 13 was removed from the cured first elastomeric layer 61. Separately, 10 wt. parts of a two-component type polydimethylsiloxane (trade name: KE 104, mfd. by Shinetsu Kagaku Kogyo K.K.) and 1 wt. part of CAT-104 (mfd. by Shinetsu Kagaku Kogyo K.K.) were mixed, stirred, and degassed under a vacuum thereby to prepare a mixture. Then, as shown in FIG. 2C, the resultant mixture was poured into a cavity surrounded by a glass plate 2, the first elastomeric layer 61 and the side mold 15, and thereafter cured by leaving it for 72 hours at 50° C., thereby to form a second elastomeric layer 62 having a thickness of 4 mm along the optical axis h. Thus, a laminate elastomeric member 6 was formed.

Then, the laminate elastomeric member 6, after the lower mold 14 and the side mold 15 were removed therefrom, was housed, as shown in FIG. 2D, in a cylindrical side plate 16 having an aperture 16a with a diameter of 20 mm, thereby to obtain a variable-focus optical device according to the present invention.

By using the thus obtained optical device, a change in the shape of a surface portion 6a of the first elastomeric layer 61 disposed in the aperture 16a was measured while the glass plate 2 was moved along the optical axis h. The glass plate 2 was moved in the direction corresponding to pressurization of the elastomeric member 6 by a distance of 0–0.4 mm along the optical axis h. As a result, the shape of the surface 6a of the first elastomeric layer 61 was deformed with excellent responsiveness and excellent reproducibility, substantially without gravitational deformation, while retaining a spherical surface with a curvature radius in the range of 50–35 mm.

Incidentally, the polysilocanes (KE 104 and KE 106) were respectively cured under the same conditions as described in the above process for producing the optical device. A storage elastic modulus (G'), a loss elastic modulus (G") and a dynamic loss factor (tan δ) of the thus cured polysiloxanes (KE 104 and KE 106) were measured according to ASTM D-4065.

Figure 3:
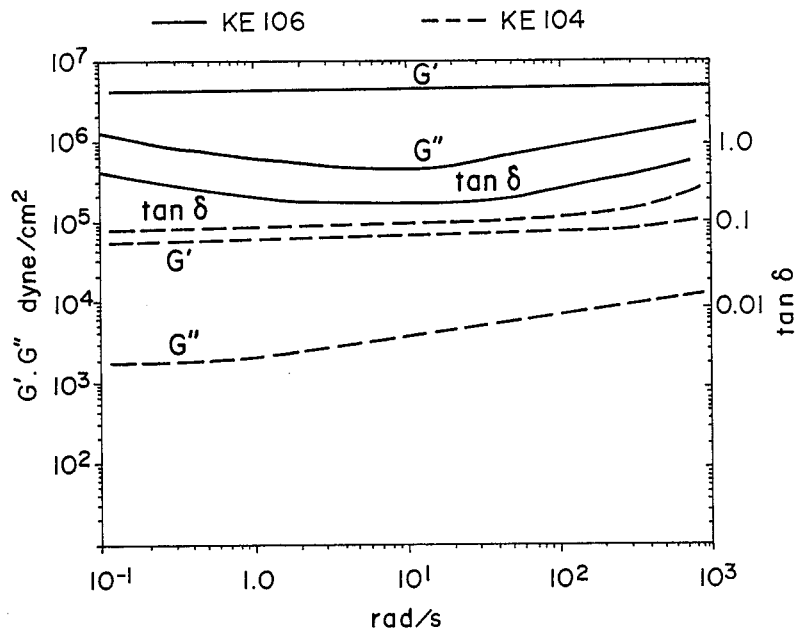
FIGS. 3 to 5 are graphs respectively showing measured values of storage elastic modulus (G'), loss elastic modulus (G"), and dynamic loss factor or loss tangent (tan δ) in the polysiloxanes prepared in Example 1, Example 2, and Example.

More specifically, a parallel-plate type viscometer of a mechanical spectrometer RDS 7700 (mfd. by Rheometrics Far East Ltd.) was charged with samples of the polysiloxanes respectively. Thereafter, G', G" and tan δ were measured at 22° C., while a torsion strain of 3% (corresponding to a torsional angle of about 10°) was applied to the respective polysiloxanes. The results are shown in FIG. 3.

EXAMPLE 2

The same procedure as in Example 1 was repeated except that a first elastomeric layer 61 was formed by using a mixture comprising 1 wt. part of A-liquid and 1 wt. part of B-liquid, respectively of a two-component type polydimethyldiphenylsiloxane (trade name: X-14-907, mfd. by Toshiba Silicone K.K.), thereby to obtain a variable-focus optical device according to the present invention.

The glass plate 2 was moved, similarly as in Example 1, by a distance of 0.4 mm. As a result, the shape of the surface 6a of the elastomeric layer 61 was deformed with excellent responsiveness and excellent reproducibility, substantially without gravitational deformation, while retaining a spherical surface with a curvature radius in the range of 50–35 mm.

Figure 4:
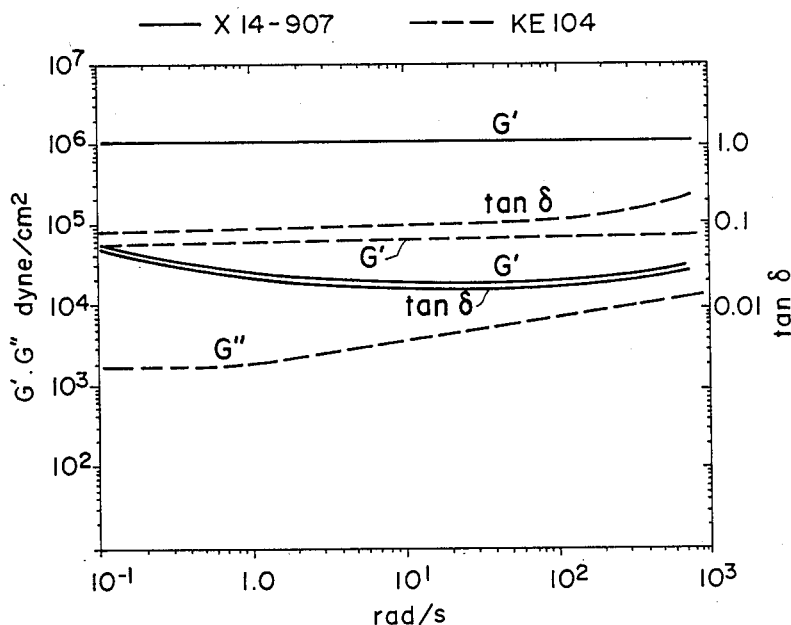

Incidentally, the polysiloxanes (X-14-907 and KE 104) were respectively cured under the same conditions as described in the above process for producing the optical device. A storage elastic modulus (G'), a loss elastic modulus (G") and a dynamic loss factor (tan δ) of the thus cured polysiloxanes were measured similarly as in Example 1. The results are shown in FIG. 4.

EXAMPLE

The same procedure as in Example 1 was repeated except that a first elastomeric layer 61 was formed by using a two-component type polydimethylsiloxane (trade name: KE 104, mfd. by Shinetsu Kagaku Kogyo K.K.) and that a second elastomeric layer 62 was formed by using a mixture comprising 6 wt. parts of A-liquid (comprising a vinylsiloxane compound) and 4 wt. parts of B-liquid (comprising a hydrogenated siloxane compound), respectively of a two-component type polydimethylsiloxane (trade name: X-32-730, mfd. by Shinetsu Kagaku Kogyo K.K.), thereby to prepare a variable-focus optical device.

The glass plate 2 was moved, similarly as in Example 1, by a distance of 0.4 mm. As a result, the shape of the surface 6a of the first elastomeric layer 61 could not retain a spherical surface as compared with that in Example 1 or in Example 2. Therefore, the usefullness of the thus prepared various-focus optical device was rather limited.

Figure 5:
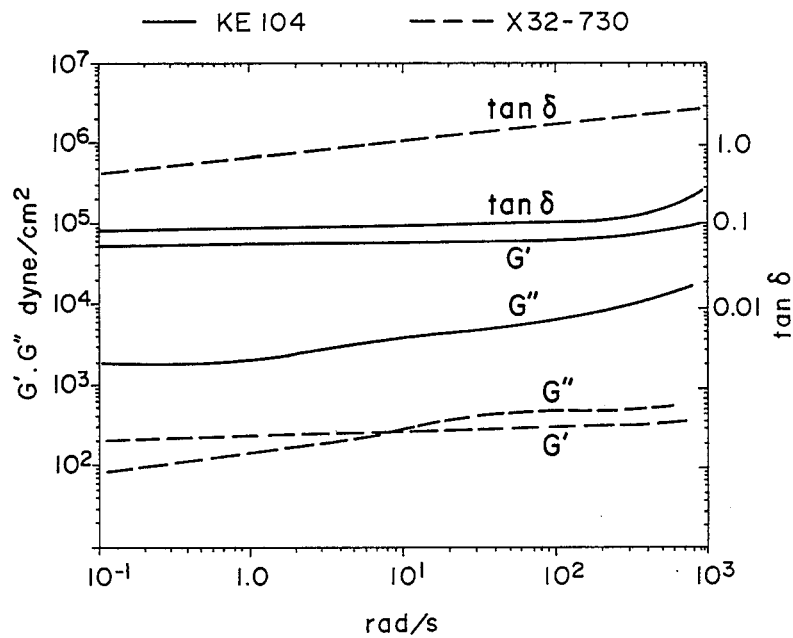

Incidentally, the polysiloxanes (KE 104 and X-32-730) were respectively cured under the same conditions as described in the above process for producing the optical device. A storage elastic modulus (G'), a loss elastic modulus (G") and a dynamic loss factor (tan δ) of the thus cured polysiloxanes were measured similarly as in Example 1. The results are shown in FIG. 5.

As described hereinabove, according to the present invention, there is provided a variable-focus optical device comprising an elastomeric member having prescribed elasticity characteristics, which is capable of constantly retaining, e.g., a spherical surface or desired aspherical surface during deformation, and excellent in responsiveness and reproducibility during repetitive deformation.

According to the present invention, there is further provided a variable-focus optical device comprising a laminate elastomeric member comprising two or more elastomeric layers having different elasticity moduli, which has an optical surface with more preferable shape.

What is claimed is:

1. A variable-focus optical device comprising:
   an elastomeric member and an aperture member having an aperture adapted for causing projection or sinking of the elastomeric member therethrough or thereat to deform the surface of the elastomeric member;
   wherein said elastomeric member is formed of plural elastic layers laminated along an optical axis and comprises an elastomeric material having a storage elastic modulus and a loss elastic modulus respectively in a range of $5 \times 10^2$ to $1 \times 10^8$ dyne/cm$^2$, and a dynamic loss factor of not larger than 1, respectively, in a frequency range of 0.1 rad/sec to $1 \times 10^3$ rad/sec.

2. An optical device according to claim 1, wherein said elastomeric member comprises a first elastomeric layer contacting the aperture of the aperture member and a second elastomeric layer laminated on the first elastomeric layer, and the first elastomeric layer has a larger elasticity modulus that the second elastomeric layer.

3. An optical device according to claim 1, wherein said storage elastic modulus and loss elastic modulus are respectively in a range of $1 \times 10^3$ to $1 \times 10^7$ dyne/cm$^2$.

4. An optical device according to claim 1, wherein said elastomeric member has a spectral transmittance of 80% or larger at 350 nm, and that of 92% or larger in a region of 500 to 700 nm.

5. An optical device according to claim 1, wherein said elastomeric member comprises a polysiloxane.

6. An optical device according to claim 5, wherein said polysiloxane comprises a portion represented by the following structural formula (I):

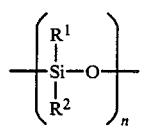

(I)

wherein $R^1$ and $R^2$ independently represent methyl, ethyl or phenyl group, respectively, and n is an integer of 25 or more.

7. An optical device according to claim 56, wherein said polysiloxane has a refractive index of 1.35 or larger.

* * * * *

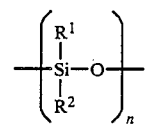

(I)

wherein $R^1$ and $R^2$ independently represent methyl, ethyl or phenyl group, respectively, and n is an integer of 25 or more.

7. An optical device according to claim 56, wherein said polysiloxane has a refractive index of 1.35 or larger.

* * * * *

UNITED STATES PATENT AND TRADEMARK OFFICE
CERTIFICATE OF CORRECTION

PATENT NO. : 4,892,396

DATED : January 9, 1990

INVENTOR(S) : Kushibiki et al.

It is certified that error appears in the above-identified patent and that said Letters Patent is hereby corrected as shown below:

COLUMN 1:

Line 10, "wit" should read --with--.

COLUMN 2:

Line 7, "nonshere," should read --nonsphere--.

COLUMN 3:

Line 4, "area" should read "are".

COLUMN 4:

Line 2, "$a_1$" should read --$a_1$,--.

COLUMN 10:

Line 55, "that" should read --than--.

COLUMN 11:

Line 10, "claim 56," should read --claim 5,--.

UNITED STATES PATENT AND TRADEMARK OFFICE
CERTIFICATE OF CORRECTION

PATENT NO. : 4,892,396　　　　　　　　　　Page  2  of  2

DATED : January 9, 1990

INVENTOR(S) : Kushibiki et al.

It is certified that error appears in the above-identified patent and that said Letters Patent is hereby corrected as shown below:

<u>COLUMN 12</u>:

Lines 1-10 should be deleted.

Signed and Sealed this

Third Day of December, 1991

Attest:

HARRY F. MANBECK, JR.

*Attesting Officer*　　　　　　　　*Commissioner of Patents and Trademarks*